United States Patent [19]

Tomoshige et al.

[11] Patent Number: 4,832,924
[45] Date of Patent: May 23, 1989

[54] PROCESS FOR PRODUCING URANIUM OXIDES

[75] Inventors: Shozo Tomoshige; Hideto Obara; Kozo Kondo, all of Uji; Keiichiro Otomura, Kurayoshi; Soichiro Yano, Okayama, all of Japan

[73] Assignee: Doryokuro Kakunenryo Kaihatsu Jigyodan, Tokyo, Japan

[21] Appl. No.: 127,913

[22] Filed: Dec. 2, 1987

[30] Foreign Application Priority Data

Dec. 26, 1986 [JP] Japan .................... 61-311102

[51] Int. Cl.$^4$ ............... C01G 43/01; C01G 43/025; C22B 60/02
[52] U.S. Cl. ............................ 423/7; 423/260; 423/15
[58] Field of Search .............. 423/260, 7, 11, 15

[56] References Cited

U.S. PATENT DOCUMENTS 3,052,515 9/1962 Donaruma .................... 423/7
4,292,279 9/1981 Reusser ....................... 423/15
4,375,452 3/1983 Jan et al. ...................... 423/7
4,517,096 5/1985 Sekine et al. ................ 210/668
4,696,768 9/1987 Ali et al. ................... 423/7 X Primary Examiner—John F. Terapane
Assistant Examiner—Virginia B. Caress
Attorney, Agent, or Firm—Wenderoth, Lind & Ponack

[57] ABSTRACT

The present invention provides a process for producing a uranium oxide by dissolving a yellow cake in sulfuric acid or hydrochloric acid, bringing the obtained solution into contact with a chelating resin of diaminocarboxylic acid type and subjecting the product to neutralizing precipitation followed by heat treatment. By the contact of the solution with the chelating resin, iron, copper, molybdenum and vanadium among the metallic impurities are removed and in the subsequent neutralizing precipitation step, other metallic impurities such as aluminum, calcium, magnesium, sodium and potassium are removed. This process can easily produce uranium oxide having a high purity using a simple apparatus.

7 Claims, No Drawings

PROCESS FOR PRODUCING URANIUM OXIDES

BACKGROUND OF THE INVENTION

The present invention relates to a process for efficiently producing uranium oxides, and more particularly, to a process for effectively removing metallic impurities contained in a starting material of a yellow cake to produce uranium oxides with a high purity.

The term "yellow cake" used herein means a uranium oxide concentrate that results from milling uranium ore. It typically contains about 80 to 90% $U_3O_8$.

Various processes for refining uranium have been proposed. Among them, a process wherein a uranium oxide is produced as an intermediate is employed widely in many countries. When a yellow cake used as a starting material in this process contains metallic impurities such as iron, copper, molybdenum, vanadium, aluminum, calcium, magnesium, sodium, potassium and the like, the purity of the resulting uranium oxide or uranium hexafluoride obtained by further refining thereof is reduced. Therefore, these metallic impurities must be removed.

These metallic impurities have conventionally been removed by solvent extraction in a tributyl phosphate/nitric acid system. In this process, the yellow cake containing the impurities is dissolved in nitric acid and then the impurities are removed by extraction with tributyl phosphate (TBP) solvent. Then a solution of uranyl nitrate $UO_2(NO_3)_2$ thus obtained is concentrated by evaporation to precipitate uranyl nitrate hydrate (UNH process) or, alternatively, ammonia is added to the uranyl nitrate solution to crystallize ammonium diuranate $(NH_4)_2U_2O_7.2H_2O$ (ADU process). The uranyl nitrate hydrate (UNH) or ammonium diuranate (ADU) is thermally decomposed by roasting it at a temperature of 500° C. or higher to form uranium oxide and to recover nitric acid or ammonia.

The above-mentioned solvent extraction process is not preferred from the viewpoint of environmental pollution, since a waste liquor containing nitrogen and phosphorus is formed in a large amount because nitric acid and tributyl phosphate are used. Further, the materials forming apparatus employed in the process are limited, since nitric acid is used. In addition, this process is economically disadvantageous, since the solvent extraction is conducted in multiple steps with a mixer-settler and, therefore, a large apparatus and a large area for the installation thereof are required. Another problem is that an explosion-proof apparatus is necessitated, since the solvent is easily inflammable.

SUMMARY OF THE INVENTION

It is therefore a primary object of the present invention to provide a process capable of producing uranium oxide having a high purity by removing the above-mentioned metallic impurities from the starting material of yellow cake.

It is another object of the invention to provide a process for producing uranium oxide wherein solvent extraction using nitric acid and tributyl phosphate is not employed so that no waste liquor containing nitrogen and phosphate is formed, and no large production unit such as a mixer-settler or large area for the installation thereof are required.

It is a further object of the invention to provide a process for producing uranium oxide wherein no inflammable solvent is used so that an explosion-proof apparatus is not required.

After intensive investigations made for the purpose of accomplishing the above-mentioned objects, the inventors have found that iron, copper, molybdenum and vanadium among the metallic impurities can be efficiently removed by dissolving the yellow cake containing the metallic impurities in hydrochloric acid or sulfuric acid in place of nitric acid and then bringing the resulting solution into contact with a chelating resin of diaminocarboxylic acid type, and then the other metallic impurities such as aluminum, calcium, magnesium and the like can be removed in the subsequent neutralization step. The present invention has been completed on the basis of this finding.

According to the present invention, there is provided a process for producing uranium oxide from a yellow cake, which comprises dissolving a yellow cake in an acid selected from the group consisting of sulfuric acid and hydrochloric acid to form a solution, bringing said solution into contact with a chelating resin of diaminocarboxylic acid type, subjecting the thus treated solution to neutralizing precipitation by adding ammonia into the solution to precipitate ammonium diuranate, and heating the thus formed ammonium diuranate to form uranium oxide.

The yellow cake employed as a starting material in the present invention usually contains therein, in addition to uranium, metallic impurities such as iron, copper, vanadium, molybdenum, sodium, aluminum, calcium, potassium, magnesium and the like. By the treatment of the solution of yellow cake with the chelating resin the metallic impurities of iron, copper, molybdenum and vanadium are removed. The remaining metallic impurities which have not been removed by the treatment with the chelating resin are removed in the subsequent neutralizing precipitation step.

Ammonium diuranate formed in the neutralizing precipitation step is heated to a temperature of 350° to 550° C. to form uranium trioxide. When ammonium diuranate is heated to a temperature of 550° C. or above, triuranium octoxide is formed.

DETAILED DESCRIPTION OF THE INVENTION

As described hereinabove, the chelating resins of diaminocarboxylic acid type used in the present invention are capable of effectively removing iron, copper, molybdenum and vanadium in the solution of the yellow cake in sulfuric acid or hydrochloric acid. Examples of the chelating resins of diaminocarboxylic acid type capable of selectively removing iron, copper, molybdenum and vanadium from the yellow cake solution include chelating resins prepared by crosslinking a phenolic compound of the following general formula:

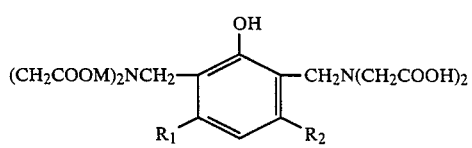

(wherein M represents an alkali metal or hydrogen, and $R_1$ and $R_2$ each represent hydrogen or an alkyl group having 1 to 3 carbon atoms) with phenols and aldehydes to form a three-dimensional structure. As for these chelating resins, those capable of reducing the iron concentration of an acidic electrogalvanizing bath are known from Japanese patent laid-open specification No. 54-121241 (laid-open on Sept. 20, 1979) and particularly that known under the trade name Uniselec UR-50 (a registered trademark, a product of Unitika Ltd.) is suitably used.

The solution of the starting yellow cake contains uranium and at least one of the above-mentioned metallic impurities such as iron, copper, molybdenum, vanadium, sodium, aluminum, calcium, potassium or magnesium. The content of the metallic impurities in the yellow cake is not particularly limited.

In the treatment of the yellow cake solution with the chelating resin of diaminocarboxylic acid type, it is preferred to adjust the pH of the solution to 0.5 to 2.5. When the pH exceeds 2.5, uranium in the yellow cake solution begins to be precipitated to cause a loss thereof and unfavorably form a radioactive waste. On the contrary, when the pH is lower than 0.5, iron, copper, molybdenum and vanadium contained as the metallic impurities in the yellow cake solution cannot be sufficiently adsorbed on the chelating resin. The yellow cake solution can be brought into contact with the chelating resin by mixing them together by stirring or by means of a column in the same manner as in an ordinary treatment with an ion exchange resin. The latter method is preferable to the former method from the viewpoint of simplification of the apparatus or the selective absorption efficiency. In passing the yellow cake solution through the column, the solution is passed through an ion exchange column packed with the chelating resin at a space velocity of 10 (l/hr) or less, preferably 0.5 to 2.0 (1/hr). By the contact with the chelating resin, iron, copper, molybdenum and vanadium are selectively adsorbed and removed.

The solution thus treated with the chelating resin is then neutralized with gaseous ammonia to form a precipitate of ammonium diuranate. A continuous multi-stage neutralizing precipitation method is preferably employed in this neutralizing precipitation step. For example, a continuous two-stage neutralizing precipitation method is employed. In the first stage of this method, the pH of the solution is adjusted in the range of 2.5 to 4.0 with calcium oxide or calcium hydroxide to remove aluminum, contained as an impurity in the solution, in the form of aluminum hydroxide. In the second stage, ammonia is introduced into a supernatant part of the solution to precipitate ammonium diuranate. Ammonia used as the neutralizing agent is preferably gaseous ammonia, since it can be handled more easily than liquid ammonia and ammonium diuranate thus formed can be precipitated, filtered and washed easily. In this neutralizing precipitation step, only ammonium diuranate is precipitated, leaving aluminum, calcium, magnesium, sodium, potassium and the like contained as the metallic impurities in the supernatant liquid.

The resulting ammonium diuranate precipitate is separated from the supernatant liquid and then heated or calcinated at 350° to 550° C. to form uranium trioxide or at 550° C. or above to form triuranium octoxide. These uranium oxides can be reduced to form uranium dioxide, which can be treated with hydrogen fluoride to form uranium tetrafluoride and further uranium hexafluoride. The uranium oxide produced by the process of the present invention is usable as a yellow cake having a high purity. This product can be used as a starting material (yellow cake) in a conversion process for producing uranium hexafluoride from a yellow cake of a high purity such as a dry process employed by Allied Chemical Corp. in U.S.A.

The following example is illustrative of the present invention.

EXAMPLE

A solution of yellow cake in sulfuric acid having a pH of 1.0 and having a composition shown in Table 1 was passed through a column packed with 50 ml of a chelating resin of diaminocarboxylic acid type at a space velocity of 1.0 (1/hr). The amount of the solution passed through the column was 10 l/l-R. The analytical results of the solution thus treated are shown in Table 2.

TABLE 1

| Sample | Composition Analytical values | | | | | | | | | |
|---|---|---|---|---|---|---|---|---|---|---|
| | Al (mg/l) | Ca (mg/l) | Cu (mg/l) | Fe (mg/l) | K (mg/l) | Mg (mg/l) | Mo (mg/l) | Na (g/l) | V (mg/l) | U (g/l) |
| Yellow Cake solution | 100 | 170 | 5 | 600 | 360 | 410 | 250 | 2.6 | 100 | 133 |

TABLE 2

| Sample | Composition Analytical values | | | | | | | | | |
|---|---|---|---|---|---|---|---|---|---|---|
| | Al (mg/l) | Ca (mg/l) | Cu (mg/l) | Fe (mg/l) | K (mg/l) | Mg (mg/l) | Mo (mg/l) | Na (g/l) | V (mg/l) | U (g/l) |
| Treated solution | 100 | 170 | 0.5 | 17 | 360 | 410 | 8 | 2.6 | 39 | 133 |

It is apparent from the results that iron, copper, molybdenum and vanadium were removed well by the treatment with the chelating resin but aluminum, calcium, potassium, magnesium and sodium could not be removed at all.

Calcium hydroxide was added to the solution thus treated with the chelating resin to adjust the pH of the solution to 3.0 and to form a precipitate. After solid-liquid separation, gaseous ammonia was blown into the supernatant liquid to form a precipitate of ammonium diuranate. The resulting ammonium diuranate precipitate was separated from liquid, washed with water and calcinated at 600° C. to remove ammonia to thereby obtain uranium trioxide. The quality level of uranium trioxide thus obtained is shown in Table 3. It can be seen from the results that uranium trioxide having a high quality level could be produced by the present invention which comprises the combination of the chelating resin treatment with the neutralizing precipitation.

TABLE 3

| Elements | Al | Ca | Cu | Fe | K | Mg | Mo | Na | V |
|---|---|---|---|---|---|---|---|---|---|
| Analytical values | 5 | 0.2 | 0.1 | 10 | 8 | 0.4 | 0.5 | 12 | 2 |

(unit: ppm/U)

As is apparent from the foregoing, according to the process of the present invention wherein no nitric acid is used at all for the dissolution of the yellow cake, no waste liquid containing nitric acid or ammonium nitrate is formed at all. Iron, copper, molybdenum and vanadium can be effectively removed by the treatment with the chelating resin and other metals such as aluminum are removed by the neutralizing precipitation step to produce a uranium oxide having a high purity.

Since the process of the present invention can be conducted without resort to the solvent extraction step, no large production unit such as a mixer-settler is necessary. Further, since no inflammable solvent is used, no special countermeasure need be taken for protection against high pressure and explosion.

While the invention has been described with respect to specific embodiments, it should be apparent to those skilled in the art that numerous modifications may be made thereto without departing from the spirit and scope of the invention.

What is claimed is:

1. A process for producing uranium oxide from a yellow cake, said process comprising dissolving a yellow cake in an acid selected from the group consisting of sulfuric acid and hydrochloric acid to form a solution having a pH of 0.5 to 2.5, bringing said solution into contact with a chelating resin prepared by crosslinking a phenolic compound of the formula:

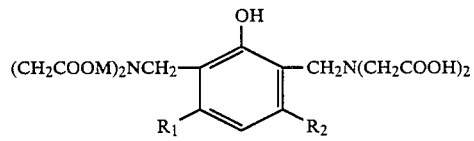

wherein M represents an alkali metal or hydrogen, and $R_1$ and $R_2$ each represent hydrogen or an alkyl group having 1 to 3 carbon atoms, with a phenol and an aldehyde to form a three-dimensional structure, subjecting the thus treated solution to neutralizing precipitation by adding ammonia into the solution to precipitate ammonium diuranate, and heating the thus formed ammonium diuranate to form uranium oxide.

2. The process according to claim 1, wherein said yellow cake contains, in addition to uranium, at least one metallic inpurity selected from the group consisting of iron, copper, vanadium, molybdenum, sodium, aluminum, calcium, potassium and magnesium; wherein iron, copper, molybdenum and/or vanadium are removed by said treatment with said chelating resin; and wherein the remaining metallic impurities not removed by the treatment with said chelating resin are removed by said neutralizing precipitation step.

3. The process according to claim 1, wherein the neutralizing precipitation step is conducted by blowing gaseous ammonia into the solution.

4. The process according to claim 1, wherein the neutralizing precipitation step is conducted by a continuous multi-stage neutralizing precipitation.

5. The process according to claim 4, wherein said multi-stage neutralizing precipitation comprises a first stage in which calcium oxide or calcium hydroxide is added to the solution to adjust pH of the solution in the range of 2.5 to 4.0 and a second stage in which gaseous ammonia is blown into the solution.

6. The process according to claim 1, wherein the ammonium diuranate is heated to a temperature of 350° to 550° C. to form uranium trioxide.

7. The process according to claim 1, wherein the ammonium diuranate is heated to a temperature of 550° C. or above to form triuranium octoxide.

* * * * *